United States Patent
Yokota et al.

(10) Patent No.: US 7,366,334 B2
(45) Date of Patent: Apr. 29, 2008

(54) METHOD OF EXTRACTION OF REGION OF INTEREST, IMAGE PROCESSING APPARATUS, AND COMPUTER PRODUCT

(75) Inventors: Hideo Yokota, Wako (JP); Satoko Takemoto, Wako (JP); Taketoshi Mishima, Wako (JP); Akitake Makinouchi, Wako (JP); Ryutaro Himeno, Wako (JP)

(73) Assignee: Riken, Wako-shi (JP)

( * ) Notice: Subject to any disclaimer, the term of this patent is extended or adjusted under 35 U.S.C. 154(b) by 1022 days.

(21) Appl. No.: 10/627,979

(22) Filed: Jul. 28, 2003

(65) Prior Publication Data

US 2004/0151355 A1 Aug. 5, 2004

(30) Foreign Application Priority Data

Jan. 31, 2003 (JP) .............................. 2003-025277

(51) Int. Cl.
G06K 9/00 (2006.01)
(52) U.S. Cl. ...................... 382/128; 382/154; 382/173; 382/190
(58) Field of Classification Search ................ 382/128, 382/154, 173, 190
See application file for complete search history.

(56) References Cited

U.S. PATENT DOCUMENTS 6,995,763 B2 * 2/2006 Gatti et al. .................. 345/424
7,110,583 B2 * 9/2006 Yamauchi ................... 382/128

OTHER PUBLICATIONS

H. Yokota et al., "Regional Automatic Extraction and Surface Data Production from Continuous Section Images", Integrated Volume-CAD System Research, RIKEN Symposium, Sep. 18 and 19, 2002, pp. 30-39.

S. Takemoto et al., "Automatic Extraction of the Interest Organization of a Biological sample from Full-Color Continuous Images", Computational Biomechanics, RIKEN Symposium, Jul. 31-Aug. 1, 2002, pp. 26-32.

Yasuzo Suto, "Three Dimensional Image Processing in Medical Field", Mar. 10, 1995, and pp. 54-63, Corona Publishing Co., Ltd., with partial English translation.

Jun-Ichiro Toriwaki "Three-Dimension Digital Image Processing", Jul. 5, 2002, pp. 18-25 and pp. 80-97, Shoko-Do, with partial English translation.

* cited by examiner

Primary Examiner—Bhavesh M. Mehta
Assistant Examiner—John B Strege
(74) Attorney, Agent, or Firm—Foley & Lardner LLP

(57) ABSTRACT

Assuming that there are three continuous frames, i.e, cross sectional images of an organism, a dummy region of interest (ROI) is specified manually in the first frame, a temporary ROI is set in the second frame at the same position as that of the dummy ROI in the first frame. Whether a specific region in the second frame is inside or outside of a true ROI is judged based on the initial judgment criterion and values of pixels in the specific region. Whether a specific region in the third frame is inside or outside of the true ROI is judged based on values of pixels of regions that have been judged to be inside the region of interest in the second frame.

21 Claims, 12 Drawing Sheets

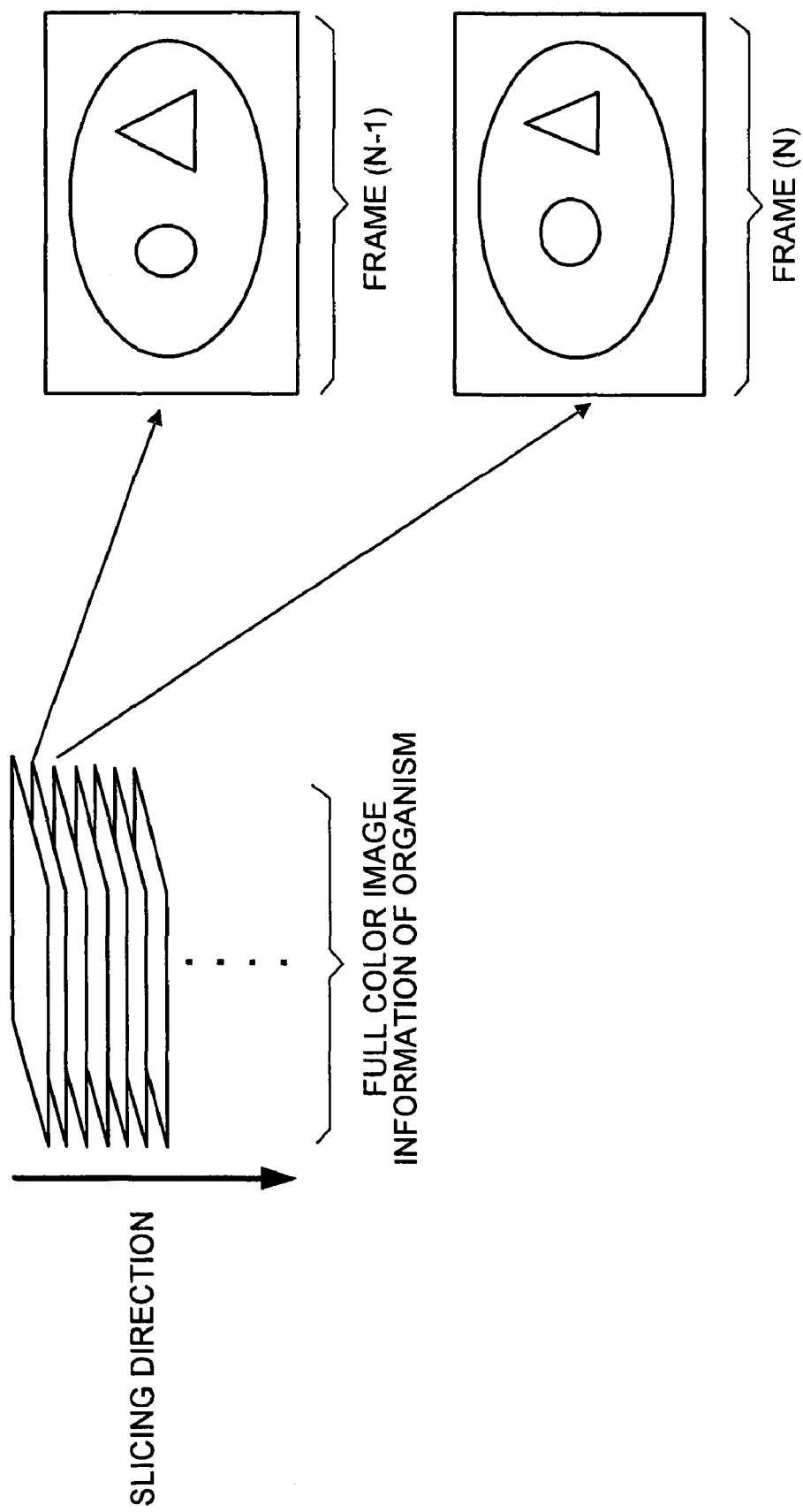

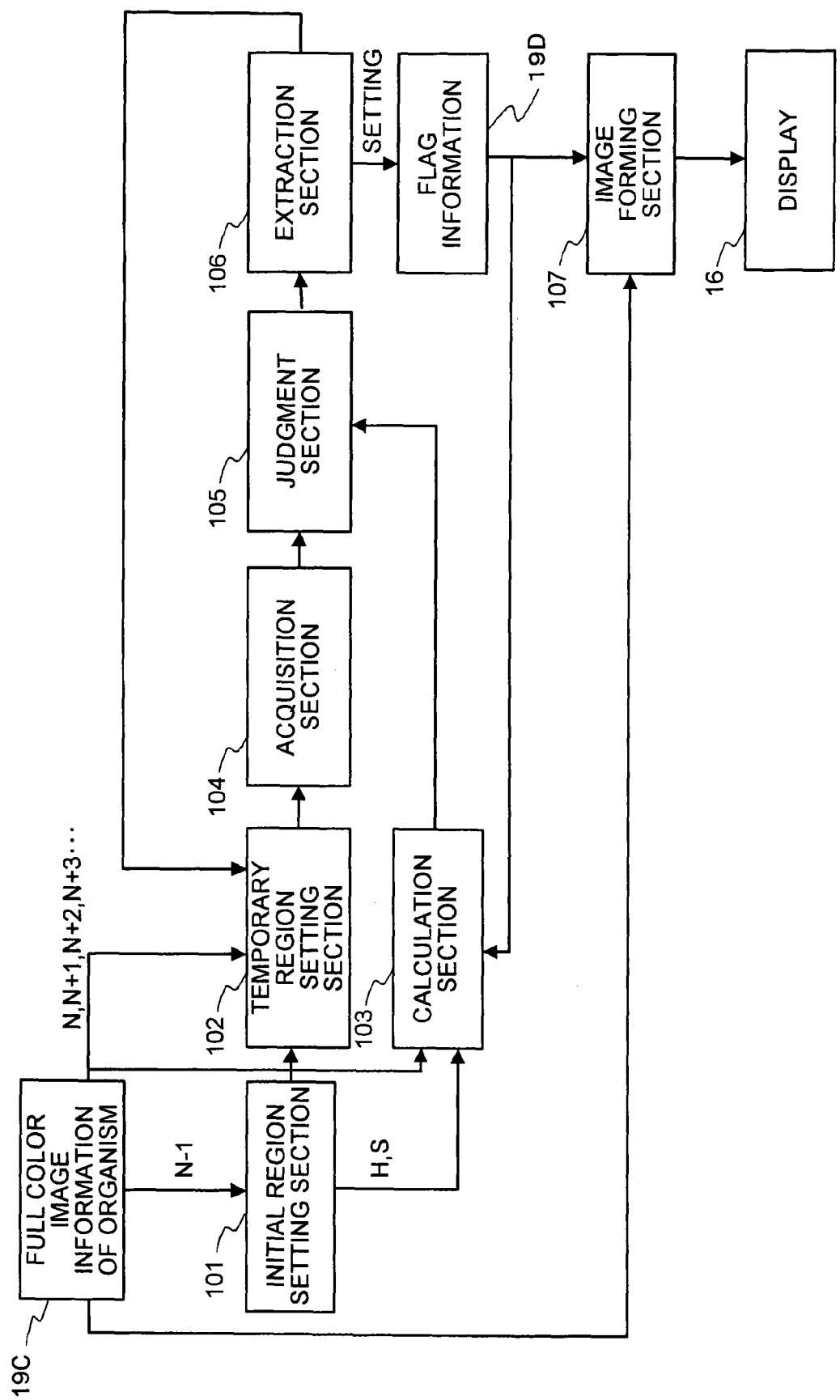

FIG.10

| FRAME | COORDINATES | FLAG |
|---|---|---|
| ⋮ | ⋮ | ⋮ |
| 100 | $(X_1,Y_1,Z_1)$ | 1 |
| | $(X_2,Y_2,Z_2)$ | 0 |
| | ⋮ | ⋮ |
| 101 | $(X_1,Y_1,Z_1)$ | 0 |
| | $(X_2,Y_2,Z_2)$ | 1 |
| | ⋮ | ⋮ |
| ⋮ | ⋮ | ⋮ |

| FRAME No. | INSIDE OF REGION | | | OUTSIDE OF REGION | | |
|---|---|---|---|---|---|---|
| | EXTRACTION AUTOMATIC / MANUAL | E | ACCURACY (%) | EXTRACTION AUTOMATIC / MANUAL | E | ACCURACY (%) |
| 1st | 1451/1493 | 42 | 97.19 | 75263/75307 | 44 | 99.94 |
| 5th | 1606/1672 | 66 | 96.05 | 75101/75128 | 27 | 99.96 |
| 10th | 1663/1726 | 63 | 96.35 | 75015/75074 | 52 | 99.92 |
| 30th | 1975/2093 | 118 | 94.36 | 74628/74707 | 79 | 99.89 |
| 50th | 2254/2329 | 75 | 96.78 | 74372/74471 | 99 | 99.87 |
| 100th | 3397/3586 | 189 | 94.73 | 73029/73214 | 185 | 99.75 |
| 130th | 3871/4083 | 212 | 94.81 | 72289/72717 | 428 | 99.41 |
| 140th | 3561/3789 | 228 | 93.98 | 71942/73011 | 1069 | 98.54 |
| 150th | 3372/4347 | 975 | 77.57 | 71828/72453 | 625 | 99.14 |

ORIGINAL IMAGE

ORIGINAL IMAGE: HUMAN EYEBALL
ROI: WHOLE OF A HUMAN EYEBALL
SIZE: 320 × 240 (pixels/slice)
NO. OF IMAGES: 840 (212 $\mu$m/pix)
Z AXIS RESOLUTION: 10 $\mu$m

RESULT

3-DIMENSIONAL MODEL

METHOD OF EXTRACTION OF REGION OF INTEREST, IMAGE PROCESSING APPARATUS, AND COMPUTER PRODUCT

BACKGROUND OF THE INVENTION

1) Field of the Invention

The present invention relates to a technology for extracting a region of interest from a digital model of a tissue in an organism.

2) Description of the Related Art

A digital model of a tissue in an organism is a 3-dimensional model that stores detailed information of a structure and dynamical characteristics of each tissue in the organism. Such a digital model is accumulating great expectations because its application in medical treatment has enabled simulation of diagnosis, treatment, and surgery.

Building of such a model necessitates collection of detailed structural data and dynamical characteristics of each tissue in the organism. The process of building of the model includes mainly three steps:

1) Collection of information inside the organism as image data
2) Recognition (segmentation of each tissue)
3) Addition of dynamical characteristics to each tissue A dynamical simulation is carried out by, for example, finite element method, to the dynamical model that is built in this manner. Results of such stimulation depend a lot on accuracy of the image data. Therefore, accuracy of a radiographic unit that is used for collection of the image data is a major factor that affects the results of the simulation.

At present, X-ray Computed Tomography (X-ray CT) and Magnetic Resonance Imaging (MRI) are mainly used to collect the image data. However, because of the characteristics of the X-ray CT and the MRI, it is not possible to collect image data of all the tissues. For example, it is not possible to collect image data of fine parts or soft tissues. Moreover, resolution of the X-ray CT or the MRI is still not sufficient and hence, at present, it is not possible to build a satisfactory model.

For building a detailed model, it is indispensable to obtain and understand information of soft tissues, which have similar constituents. However, it is not possible to acquire this information with the X-ray CT or the MRI.

In recent years, research is being carried out to use colored information contained in actual tissues in an organism to acquire detailed data of tissues in the organism. For example, in Visible Human Project (hereinafter "VHP") carried out by National Library of Medicine, United States of America, and Colorado University, a human body was sliced at every 0.33 millimeter and surfaces of these slices were radiographed to obtain full colored continuous cross sectional image of inside of the human body. In the VHP, the human body is first preserved by special cooling process and then cut at intervals of 0.3 millimeter each from head to toe. Each slice, after cutting, is photographed by a colored digital camera having resolution of 2000×2000 pixels and the data is acquired. Thus, this process can not be repeated so often because it is a time taking, hard, and troublesome process.

The applicant, Scientific Research Center, Japan, has developed a microscope that can obtain 3-dimensional color-information of internal structure of an organism. The organism is sliced at an interval of tens of micrometers, and the slice is photographed by a CCD camera that is placed right above the slice surface, thereby enabling to obtain full colored continuous cross sectional images without shift in the axis. With this microscope, it is possible to obtain about 10,000 continuous images in just an hour.

The digital model is built using the full colored data acquired, for example, by the VHP or the microscope developed at the Scientific Research Center, Japan. However, the use of full colored data in building of the digital model has created new problems. Firstly, the full colored image is quite different in appearance from the conventional black and white image, so that the diagnosis has become difficult. Secondly, there is an enormous increase in the information. Because of these problems, it has become difficult to perform recognition (segmentation) satisfactorily using the full colored data.

Generally, in segmentation, it is assumed that in an image, a part (region of interest) corresponding to one object (tissue of interest) has almost uniform characteristics (density, texture etc.) and the characteristics change suddenly in an area of boundary with a different object (with a different tissue). Based on this assumption, the segmentation can be performed by following two methods:

1) extracting edge of the tissue of interest in the image, i.e., edge extraction; and
2) splitting the image into parts based on some constraint, i.e., region splitting.

Snake model implementation and level setting are examples of the edge extraction. Region growing, in which regions are combined based on some constraint, is opposite of the region splitting. Hereinafter, both the region growing and the region splitting will be collectively referred to as "region growing".

Following publications, for example, disclose technology relating to the present invention: "Three-dimensional Digital Image Processing" by Jun-ichiro Toriwaki, published by SHOUKOUDO, and "Three Dimensional Image Processing in Medical Field—Theory and Applications—" by Suto Yasuzo, published by CORONA PUBLISHING CO. LTD.

In the edge extraction, since sudden changes in the values of the pixels are emphasized to detect a boundary between the pixels, noise in the image or complications in a shape of the tissue of interest give rise to false or discontinuous edge. Moreover, as the information becomes enormous, it becomes difficult to distinguish between the characteristics features that can be and can not be used for the edge detection. These problems become prominent as the shape of the tissue becomes complicated. Thus, the edge extraction is not a good choice.

On the other hand, the region growing has almost no influence of the noise in the image. Moreover, since a region is extracted (as against an edge) in the region growing, the overall structure of the image can easily be grasped, without studding new structures. However, if the region has a very small width (e.g., like a line) and, if the characteristics change gradually (as against abruptly), the regions that should have been spit or combined are not split or combined.

A segmentation method in which both the edge extraction and the region growing are used is known. In this method, since information about the edge is used in deciding whether to combine or split the regions, discontinuity in the edge does not much affect the result, moreover, the regions can be combined or split more accurately as compared with the region growing.

However, in the region growing, it is necessary to assign parameters in advance as control conditions for distinction of regions. Furthermore, the process cannot be completed if stopping conditions are not set to extension of region that is generated. Automatic adjustment of parameters and conditions, matching with the image characteristics is difficult and hence not yet realized. Therefore, a proper segmentation result of a complicated image cannot be expected.

Besides, an interpolation of role of parameters that do not match with the image characteristics by including an interactive correction process at each stage of distinction is proposed. The interpolation is a way of carrying out proper segmentation by monitoring of process of extraction of region and specifying and correcting of over extraction occurred due to inappropriate stopping conditions of extension of region by a person having knowledge of anatomy.

However, when the amount of information is enormously, the interpolation cannot be accepted widely as it necessitates correction process to be carried out manually.

Thus, although the region growing has many advantages over the edge extraction, the effect can be demonstrated only when specified parameters and conditions are assigned corresponding to ideal data. In normal processing, no good results can be achieved without human intervention. The full color image of inside of the organism on which research work is being done nowadays, has complicated variation of density and shape and total capacity of data is large. Therefore, it is not possible to achieve good results of segmentation by applying conventional ways as they are.

SUMMARY OF THE INVENTION

It is an object of the present invention to provide a better technique for extracting a region of interest from a digital model of a tissue in an organism.

An image processing apparatus according to one aspect of the present invention extracts a region of interest from continuous frames of cross sectional images of an organism. The continuous frames include a first frame, a second frame that is next to the first frame, a third frame that is next to the second frame, and onward frames that are after the third frame. The image processing apparatus includes a calculating unit that calculates an initial judgment criterion for the region of interest in the first frame; a first judging unit that judges whether a specific region in the second frame is any one of inside and outside of the region of interest based on the initial judgment criterion and values of pixels in the specific region; and a second judging unit that judges whether a specific region in the third frame and in the onward frames is any one of inside and outside of the region of interest based on values of pixels of regions that have been judged to be inside the region of interest in the previous frame.

An image processing apparatus according to another aspect of the present invention extracts a region of interest from continuous frames of cross sectional images of an organism. The continuous frames include a first frame, a second frame that is next to the first frame, a third frame that is next to the second frame, and onward frames that are after the third frame. The image processing apparatus includes a calculating unit that calculates a first initial judgment criteria and a second initial judgment criteria, wherein the first initial judgment criteria is for judging whether a specific region in the first frame is inside of the region of interest, and the second initial judgment criteria is for judging whether a specific region in the first frame is outside of the region of interest; a first judging unit that judges whether a specific region in the second frame is any one of inside and outside of the region of interest based on the first judgment criteria, the second judgment criteria, and values of pixels in the specific region; and a second judging unit that judges whether a specific region in the third frame and in the onward frames is any one of inside and outside of the region of interest based on values of pixels that have been allocated to inside of the region of interest and a values of pixels that have been judged to be inside the region of interest and values of pixels that have been judged to be outside the region of interest in the previous frame.

A method according to still another aspect of the present invention is a method of extracting a region of interest from continuous frames of cross sectional images of an organism, the continuous frames including a first frame, a second frame that is next to the first frame, a third frame that is next to the second frame, and onward frames that are after the third frame. The method includes calculating an initial judgment criterion for the region of interest in the first frame; a first judging of judging whether a specific region in the second frame is any one of inside and outside of the region of interest based on the initial judgment criterion and values of pixels in the specific region; and a second judging of judging whether a specific region in the third frame and in the onward frames is any one of inside and outside of the region of interest based on values of pixels of regions that have been judged to be inside the region of interest in the previous frame.

A method according to still another aspect of the present invention is a method of extracting a region of interest from continuous frames of cross sectional images of an organism, the continuous frames including a first frame, a second frame that is next to the first frame, a third frame that is next to the second frame, and onward frames that are after the third frame. The method includes calculating a first initial judgment criteria and a second initial judgment criteria, wherein the first initial judgment criteria is for judging whether a specific region in the first frame is inside of the region of interest, and the second initial judgment criteria is for judging whether a specific region in the first frame is outside of the region of interest; a first judging of judging whether a specific region in the second frame is any one of inside and outside of the region of interest based on the first judgment criteria, the second judgment criteria, and values of pixels in the specific region; and a second judging of judging whether a specific region in the third frame and in the onward frames is any one of inside and outside of the region of interest based on values of pixels that have been allocated to inside of the region of interest and a values of pixels that have been judged to be inside the region of interest and values of pixels that have been judged to be outside the region of interest in the previous frame.

The computer programs according to still other aspects of the present invention realize the methods according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is an illustration of a method of extraction of a region of interest in the present invention;

FIG. 7 is a block diagram of functioning in the present embodiment;

FIG. 10 illustrates how the flag information is managed in the present embodiment;

FIG. 12 illustrates the results of the first experiment in a tabular form.

DETAILED DESCRIPTIONS

The present invention is characterized by setting two initial judgment criteria (either of a density median and an average density), one for inside of the region of interest and one for outside of the region of interest. The initial judgment criteria for inside of the region of interest will be referrer to inside initial-judgment criteria, and the initial judgment criteria for outside of the region of interest will be referrer to outside initial-judgment criteria.

Value of each pixel (hereinafter, "pixel value") in a frame, which is a frame in a plurality of continuous frames, is compared with the inside initial-judgment criterion and the outside initial-judgment criterion, respectively.

If the pixel value satisfies the inside initial-judgment criterion, then it is judged that that pixel is to be allocated to a region that is inside of the region of interest. The inside initial-judgment criterion is re-set based on a pixel value (3-dimensional structure) of a new region of interest that includes the region that is judged as the region to be allocated to the region of interest and the inside of the region of interest.

On the other hand, if the pixel value satisfies the outside initial-judgment criterion, then it is judged that that pixel is to be allocated to a region that is outside of the region of interest. The outside initial-judgment criterion is re-set based on a pixel value (3-dimensional structure) of a new region of interest that includes the region that is judged as the region outside the region of interest.

For the next frame in the continuous frames, the judgment of whether inside or outside of the region of interest is made based on the re-set inside initial-judgment criterion and outside initial-judgment criterion.

Figure 1:
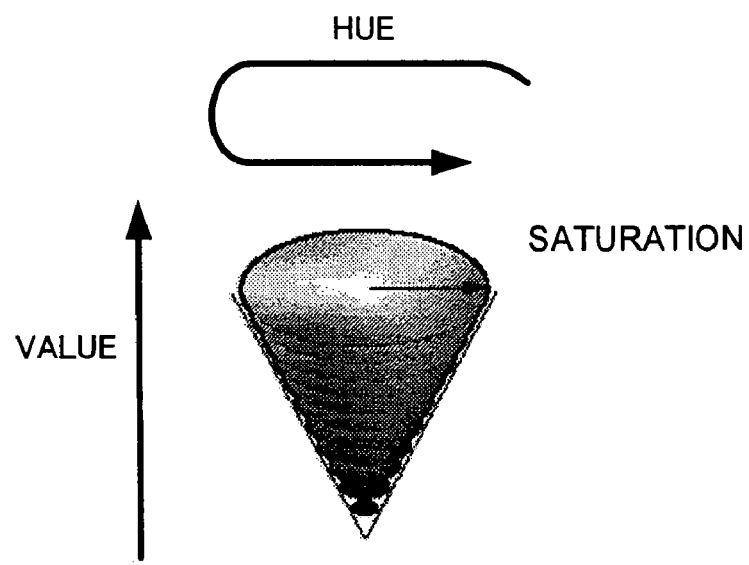
FIG. 1 is an illustration of an HSV color space.
Figure 2:
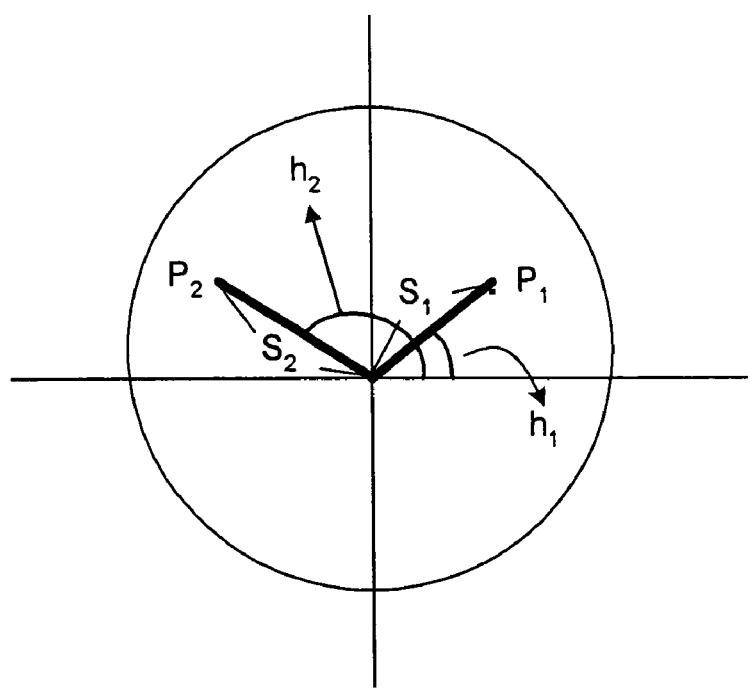
FIG. 2 is an illustration of spherical coordinates in the present invention.

FIG. 1 is an illustration of an HSV (H: hue, S: saturation, and V: value) color space and FIG. 2 is an illustration of spherical coordinates. FIG. 3 and FIGS. 4A to 4D are illustrations of a method of extraction of the region of interest in the present invention. FIG. 5 is an illustration of a region growing of the region of interest in 3-dimensional space in the present invention.

A full color image has three color vector values for each pixel according to an RGB (R: red, G: green, and B: blue) color system. For each 2-dimensional image, it is necessary to distinguish boundary of tissues to extract the region of interest. For this it is necessary to recognize a minute difference of color between tissues. So, the minute variation in color between neighboring pixels is a point of focus.

While extracting the region of interest, threshold value can be applied as the pixel value. However, there is a less remarkable variation of color in proximity of the boundary of tissues in the organism and there is a complicated color distribution from place to place. Therefore, it is difficult to extract the region with a uniform threshold value.

This led to an adoption of following two points in the extraction in the present invention.

(1) Calculation of difference of density between pixels by using the pixel value expressed by HSV color model, and (2) Distinction of whether inside or outside of region (extended region growing) focusing on a local region and not applying a uniform threshold value for the whole image.

Following are two reasons for using the HSV color model.

(1) It is easy to distinguish the boundary of tissues in the organism as compared to the RGB model.

(2) In the same tissue, there is no considerable variation in color of H and S values and the values are quite stable.

The segmentation is carried out by employing the pixel values, especially the H value and the S value expressed in the HSV model. But, vector values of H, S, and V expressed in the HSV model are not mutually equivalent. Since they generate a peculiar space as illustrated in FIG. 1, when the difference between the densities of pixels is calculated, a proper value cannot be achieved in a normal Euclidean distance.

Therefore, while calculating the difference between densities of pixels at two points, to avoid losing of characteristics of the HSV space, distance in spherical coordinates by H and S were calculated. For example, when the pixel values of images P1, P2 were considered as $$f_{P_1}=(h_{P_1},s_{P_1},v_{P_1}), f_{P_2}=(h_{P_2},s_{P_2},v_{P_2})$$

respectively, the difference of density δ between the pixels P1 and, P2 is calculated by following equations (1), (2), and (3)

$$y_1=(s_{P_1}\cdot\cos(2\pi h_{P_1})-s_{P_2}\cdot\cos(2\pi h_{P_2}))^2 \quad (1)$$

$$y_2=(s_{P_1}\cdot\sin(2\pi h_{P_1})-s_{P_2}\cdot\sin(2\pi h_{P_2}))^2 \quad (2)$$

$$\delta(P_1,P_2)=\sqrt{y_1+y_2} \quad (3)$$

The present invention includes judging whether the pixel is to be allocated to the region of interest or not by applying the technique of calculating the difference between densities between the pixels to the 3-dimensional local region. Following is an explanation based on FIG. 3, FIGS. 4A to 4D, and FIG. 5.

While selecting an initial image (frame N−1) from the continuous cross sectional images of the organism (continuous frames of the full color image information of the organism), it is desirable that the region of interest having a visible size, is see in that image (refer to FIG. 3). Then, then an operator indicates a region which he/she thinks is a region of interest in the initial image. Although this is a manual operation, it is preferable because it gives better results. In the example in FIG. 3, a direction of frames N−1, N, N+1 is a direction of slicing which progresses towards center of the region of interest.

Figure 4A:
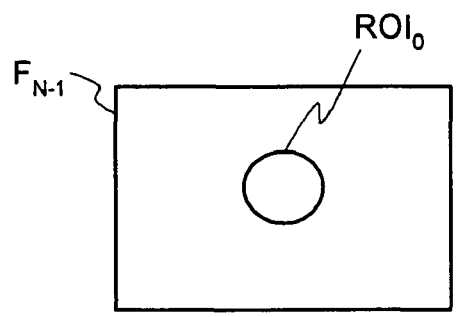
FIGS. 4A to 4D are illustrations of a method of extraction of the region of interest in the present invention.
Figure 5:
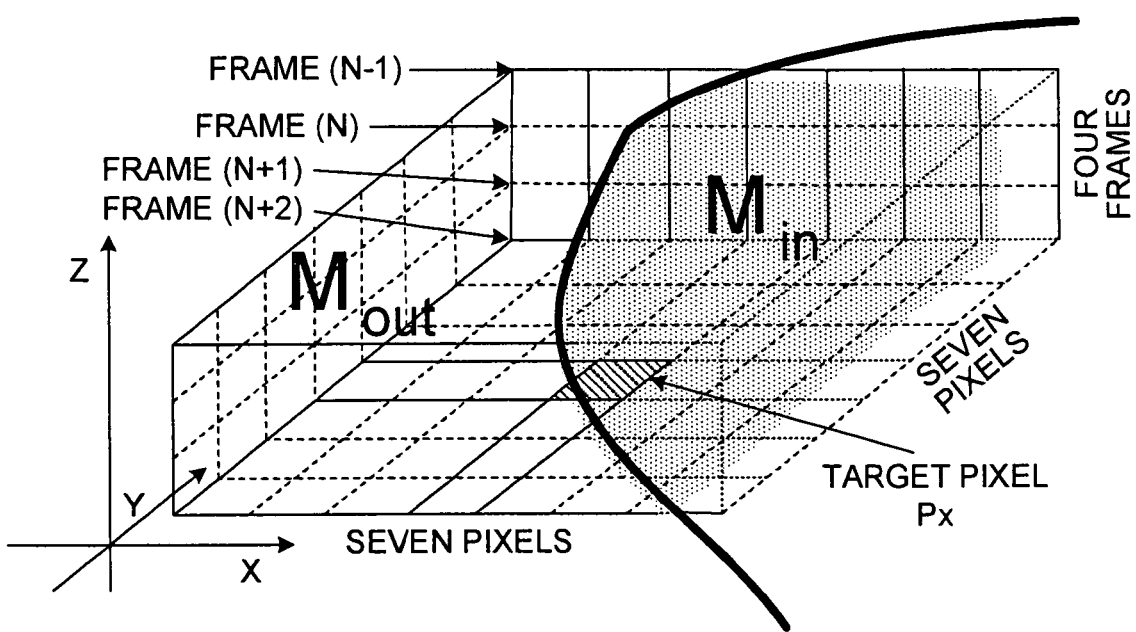
FIG. 5 is an illustration of a region growing of a region of interest in a 3-dimensional space in the present invention.

When the operator specifies the region in an image of, for example, frame N−1, that region is extracted as the region of interest ROI0 (refer to FIG. 4A). Moreover, in the next frame N, a region S that is exactly at the same position as the region ROI0 in the image of the frame N−1, is selected as a temporary region (refer to FIG. 4B).

Figure 4C:
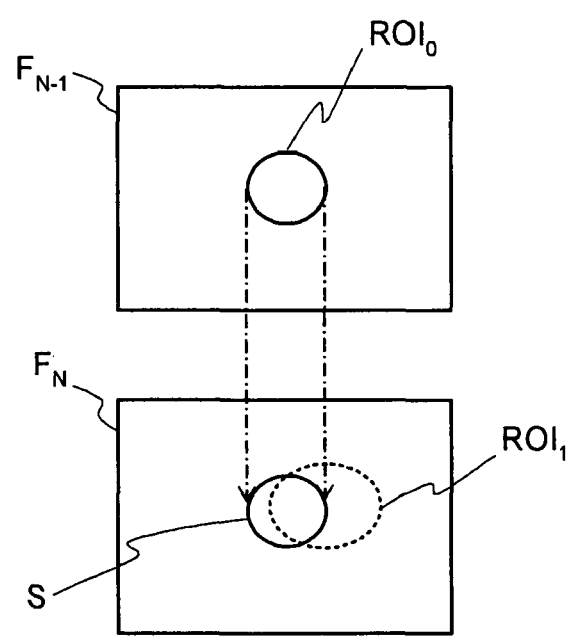
Figure 4B:
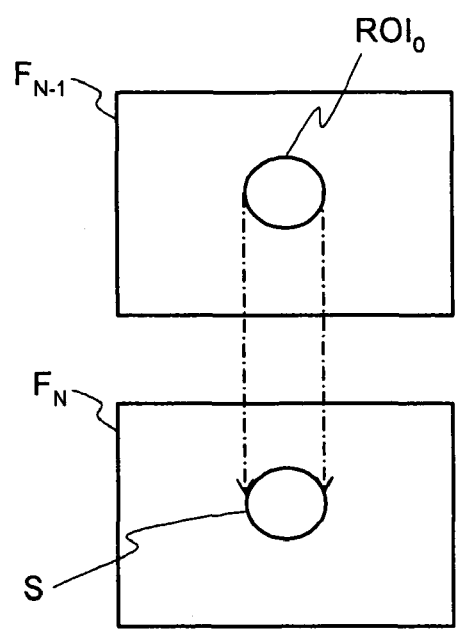
Figure 4D:
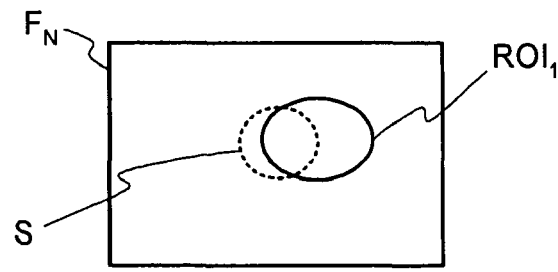

Thereafter, due to extended region growing in the present invention, a proper region, i.e. an actual region of interest ROI1 is extracted using the temporary region S (refer to FIG. 4C). Thus, the extraction of the region of interest ROI1 is completed (refer to FIG. 4D).

In the extended region growing, the region of interest ROI1 in the frame N is extracted from the region of interest ROI0 in the frame N−1 by using the values of hue and saturation of the pixels. Similarly, region of interests in the frames N+1, N+2, N+3, . . . , are extracted from the region of interests in the consecutive previous frame.

That is, for each frame, to start with, a region in the same position as that of the region of interest extracted in the previous frame is assigned as the temporary region of interest. Moreover, for each pixel at the boundary of the temporary region, it is checked whether that pixel is inside or outside of the region of interest.

FIG. 5 illustrates a region formed by four frames (N−1, N, N+1, N+2) with seven pixels in the X and Y directions respectively. Assume that the pixel Px is the target pixel that is to be checked whether it is inside or outside of the region of interest (see hatched area).

The density median Min of hue (H) and saturation (S) of pixel that is judged to be inside the region till that particular time in that local region is calculated. Similarly, the density median Mout of H value and S value of pixel that is judged to be outside of the region till that particular time is also calculated.

$$M = \begin{cases} M_{in} = (M_{h_{in}}, M_{s_{in}}) & \text{if inside} \\ M_{out} = (M_{h_{out}}, M_{s_{out}}) & \text{otherwise} \end{cases} \quad (4)$$

It is examined whether a pixel value of the pixel Px is close to the characteristics of either of inside and outside of the region of interest of the local region and then determined whether it is either of inside and outside of the region. Practically, the difference of density 'd' between the pixel Px and a central value M of density depending on value of H and S for inside and outside of the region respectively, are calculated. Px is fetched in either of the inside and the outside of the region. This is expressed in equations (5) and (6).

$$d = \begin{cases} d_{in}( = \delta(P_0, M_{in})) \\ d_{out}( = \delta(P_0, M_{out})) \end{cases} \quad (5)$$

$$P_0 = \begin{cases} \text{inside if } d_{in} \leq d_{out} \\ \text{outside otherwise} \end{cases} \quad (6)$$

This process is carried out for all pixels at the boundary. The process continues automatically till the end of the incorporation to the inside and outside of the region. Here, the end of the incorporation means end of setting of proper boundary of region by repeating either of incorporation and exclusion to and from inside of the region.

Thus, after completion of extraction of the boundary in the frame N−1, the extraction of the boundary is performed in the consecutive frames N, N+1, and N+2.

Figure 6:
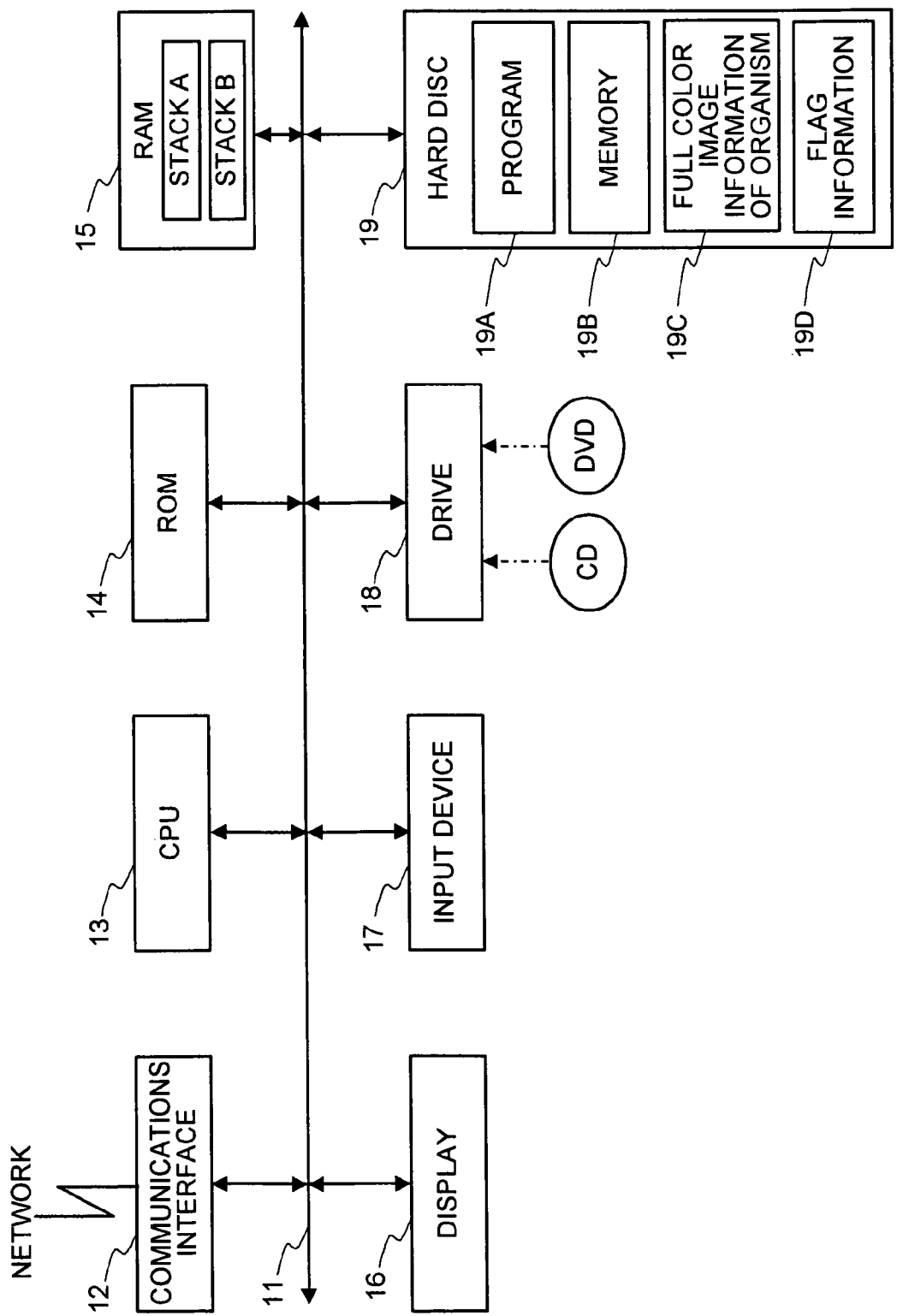
FIG. 6 is a block diagram of a structure of an image processing apparatus in an embodiment of the present invention.
Figure 8A:
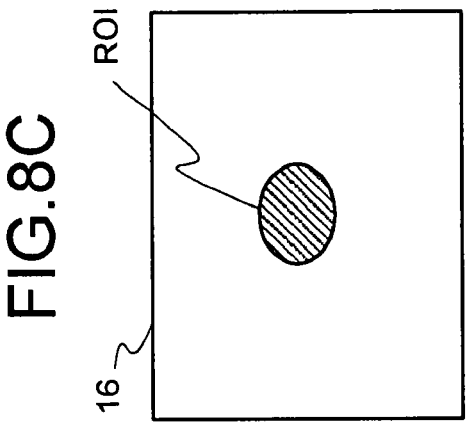
FIGS. 8A to 8F are examples of transition of display in the present embodiment.
Figure 8D:
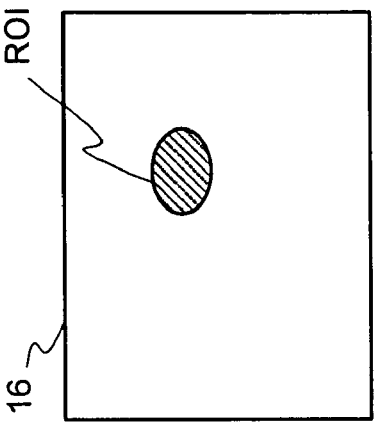
Figure 8B:
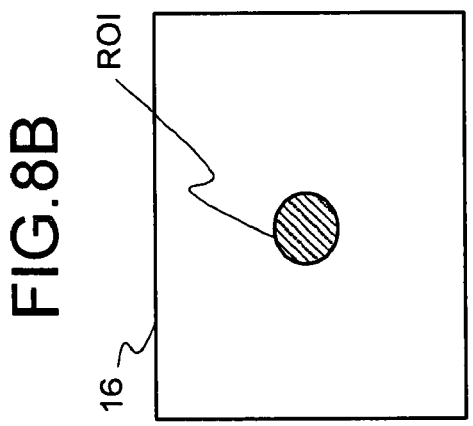
Figure 8E:
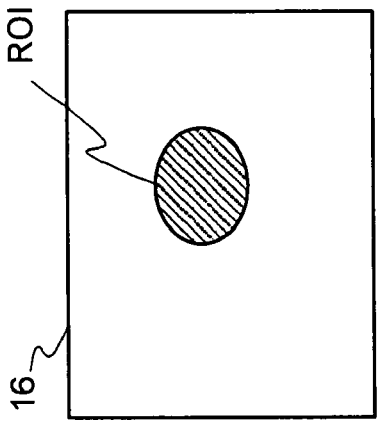
Figure 8C:
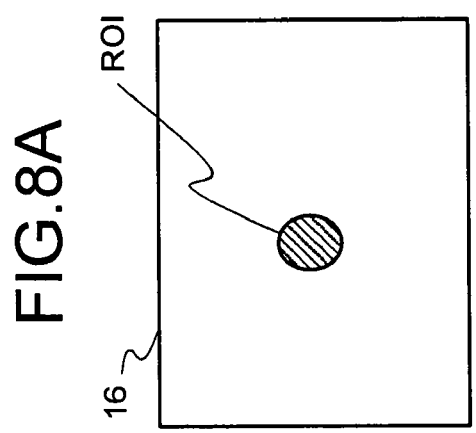
Figure 8F:
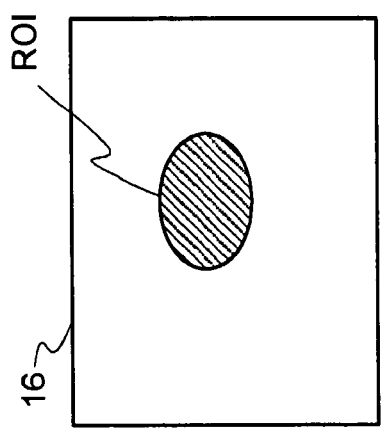

FIG. 6 is a block diagram of an image processing apparatus in the embodiment of the present invention. A computer program for realizing the method according to the present invention is supplied to this image processing apparatus by the way of reading the computer program from a recording medium using a drive. The recording medium may be a floppy disk, a compact disc (CD), or a digital video disc (DVD). On the other hand, the computer program may be downloaded via a network such as the Internet.

In the image processing apparatus according to the present invention, a communication interface 12, a central processing unit (CPU) 13, a read only memory (ROM) 14, a random access memory (RAM) 15, a display 16, an input device 17, a drive 18 and a hard disc 19 are connected to an internal bus 1 and address signals, control signals, data etc. are transmitted, thus realizing the extraction of the region in the present embodiment. The input device may include a keyboard or a mouse or both.

The communication interface 12 has a function of connecting to a communication network such as the Internet. The CPU 13 controls the apparatus based on an operating system (OS) and also controls a function of realizing processing based on an application program. The OS is stored, for example, in the ROM 14 and the application program is stored, for example, in the hard disc 19. The ROM 14 may also store other computer programs.

The RAM 15 is a memory that is used as a work area by the CPU 13. The RAM 15 also stores stacks A and B that are described later.

The display 16 displays menus, images, status etc. The operator uses the input device 17 to input data and/or commands, and to specify positions on a screen. The drive 18 reads data or computer programs from the recording medium.

The hard disc 19 includes spaces for storing a program 19A, a memory 19B, full color image information of an organism 19C, and flag information 19D etc. The program 19A is the computer program for realizing the method according to the present invention. The memory 19B stores results of execution of the computer program.

The full color image information of an organism 19C is a data file that is read through the communication interface 12, the drive 18 etc. This full color image information 19C of an organism is an image of a cross section of the organism that is formed by a plurality of continuous frames. The flag information 19D is a data of red, green, and blue (RGB data) expressed as one flag corresponding with coordinates to each frame of the full color image information 19C of an organism.

FIG. 7 is a functional block diagram of the image processing apparatus according to the present embodiment. FIGS. 8A to 8F are examples of transition of display in the present embodiment. The image processing apparatus functionally includes an initial region setting section 101 that sets the initial region of interest, a temporary region setting section 102 that sets a temporary region, a calculation section 103 that calculates the density median, an acquisition section 104 that acquires pixel value near to boundary, a judgment section 105 that judges whether a pixel is inside or outside of the region, an extraction section 106 that extracts the region of interest, and an image forming section 107 that forms images based on image data.

To start with, the initial region setting section 101 acquires an image of the frame N−1 from full color image information of an organism. The operator specifies an initial region of interest appropriately using the input device 17 (see FIG. 6). The calculation section 103 calculates the density median from the density of each pixel inside the set region of interest.

The temporary region setting section 102 sets a temporary region in frame N in a position that is same as the region of interest in the frame N−1. Thereafter, the acquisition section 104 acquires the pixel value of the pixel near to the boundary of the inside and outside of the temporary region.

The judgment section 105 judges whether inside or outside of the region by the extended region growing based on the pixel value of the pixel near to the boundary and the density median calculated in the calculation section 103. Moreover, the judgment in the local region of 7×7×4 starts after completion of the extraction of region of previous four frames. Therefore, if the frame at the start of the extraction is N, the local region of 7×7×4 from the frame N+3 is used.

The extraction section 106 extracts by either of extension and contraction of the region of interest based on the judgment of whether either of inside and outside of the region and the result of the extraction is reflected in the flag information 19D.

For the next continuous frame N+1, the density median of the 3-dimensional local region formed by the frame N−1 and the frame N is calculated in the calculation section 103. At this time, in the temporary region setting section 102, the region of interest of the frame N is fetched by the flag information 19D and the temporary region is set according to this region of interest. Thereafter, the region is extracted by the extended region growing in a similar way.

For displaying the region of interest that is already extracted, data to be displayed is generated based on the flag information 19D by the formation section 107 and the full color image information 19C of an organism. Thus, the transition of display of the region of interest ROI is as in FIGS. 8A to 8F.

Figure 9:
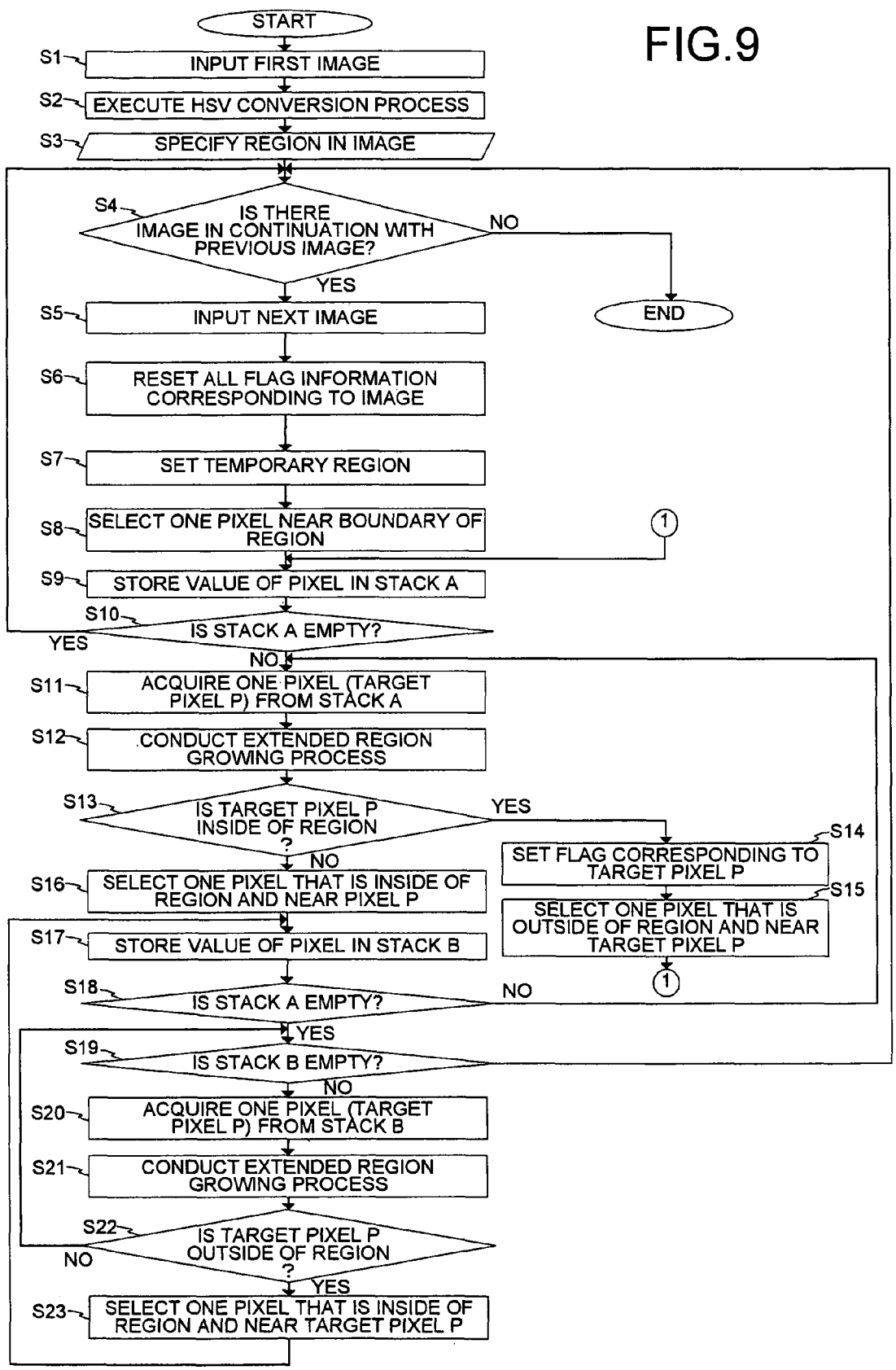
FIG. 9 is a flowchart of the method according to the present embodiment.
Figure 11A:
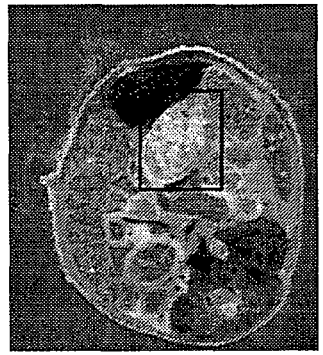
FIG. 11A is the original image.
Figure 11C:
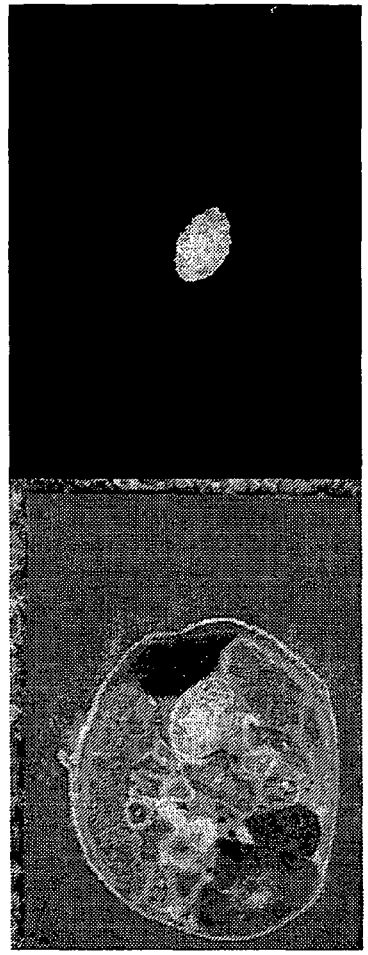
FIG. 11C is a resultant image according to a first experiment.
Figure 11B:
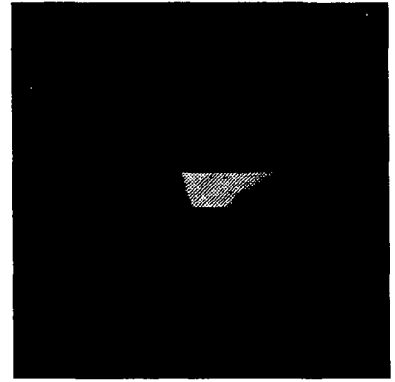
FIG. 11B is the 3-dimensional model.

FIG. 9 is a flowchart of the method according to the present embodiment. FIG. 10 illustrates how the flag information is managed. The process in FIG. 9 is realized by executing the computer program 19A. However, the display is according to the function blocks in FIG. 7.

To start with, a first image (i.e., frame N−1) is input (step S1) and HSV conversion process is executed with respect to the image (step S2). Then, the operator specifies a region in the image (step S3).

It is decided whether a next continuous image (i.e., frame N) exists (step S4). If the next image exists, that image is input (step S5), if the next image does not exist then the process is terminated. At this time, all the flag information corresponding to the next image is reset (step S6).

In the next image, a temporary region is set (step S7). The temporary region is same as the region of interest in the previous image. A pixel that is near the boundary of the region of start of extraction is selected (step S8) and the value of that pixel is stored in the stack A (step S9).

It is judged whether the stack A is empty (step S10). If the stack A is empty (YES at step S10), then the process control returns to the step S4. If the stack A is not empty (NO at step S10), a target pixel P is fetched from the stack A (step S11) and the extended region growing is executed in a local region (step S12).

It is judged whether the target pixel P is inside the region of interest (step S13). If the target pixel P is inside the region of interest (YES at step S13), a flag is set for the target pixel P (step S14) and a pixel outside the region of start of extraction and near the target pixel P is selected (step S15). Then the system control returns to the step S9.

The flag information for pixels in a frame is stored in correlation with the coordinates of the pixels (see FIG. 10). For example, if a pixel, in a frame 100, with coordinates (X1, Y1, Z1) is judged to be inside the region of interest, flag "1" is set for that pixel. Thus, for example, a pixel, in frame 101, with the coordinates (X2, Y2, Z2) has a flag "1", so that that pixel is judged to be inside of the region of interest.

If the target pixel P is inside the region of interest (NO at step S13), a pixel is selected inside the region and near the target pixel P (step S16) and a value of the pixel is stored in the stack B (step S17). It is judged whether the stack A is empty (step S18). The stack A stores values of pixels that are inside of the region.

If the stack A is not empty (NO at step S18), the system control returns to step S11. If the stack A is empty (YES at step S18), then it is judged whether the stack B is empty (step S19).

If the stack B is empty, (YES at step S19), it means that the process for the first image is complete, therefore, the system control returns to step S4. In this manner, if the next image is available, then the same process is repeated for the next image.

If the stack is not empty (NO at step S18), a pixel is fetched from the stack B as a target pixel P (step S19) and this target pixel P is subjected to extended region growing (step S21). It is judged whether the target pixel P is outside of the region (step S22). If the target pixel is outside of the region (YES at step S22), then a pixel that is inside the region and near the target pixel P is selected (step S23), and the selected pixel is stored in the stack B (step S17). The stack B stores values of pixels that are outside of the region. If the target pixel is judged to be inside the region (NO at step S22), the system control returns to step S19.

According to the present embodiment, by the extended region growing, a 3-dimensional local space around the target pixel is used and extraction of region is carried out considering the density median inside and outside the region of interest in the 3-dimensional local space around the target pixel as the judgment criterion. Therefore, it is possible to take into account judgment for a plurality of the previous frames in continuity rather than the frame that is to be extracted. This enables realization of automatic segmentation by the extended region growing. This allows accurate extraction of the region even in a case of variation in color of the same internal organ and in a case of presence of foreign matter in the internal organ. Furthermore, it is also possible to eliminate stopping condition of extension and arbitrary parameters that were problematic in conventional region growing and to avoid immobilization of judgment criterion.

Although the density median is used as data of the judgment criterion in the present embodiment, the present invention is not restricted to use only the density median. It is desirable to use the density median, but it is possible to achieve similar effect by using an average density.

Although the 3-dimensional local region is explained as of the size 7×7×4 in the present embodiment, the present invention is not restricted to this size only. A smaller size, like 3×3×2 or a bigger size can also be used. It is also possible to have large, medium, and small sizes, thereby assigning respective weight to each.

Although an example of a color image is given in the present embodiment, a black and white image can also be used.

Although the extraction of the region of interest was carried out manually for the frame N−1, that is the initial frame, the present invention is not restricted to the manual extraction only. The extraction can also be carried out automatically by an image processing technology.

FIGS. 11A to 11C and FIG. 12 illustrate the data and results of a first experiment. A stomach of a mouse was extracted from 150 continuous cross sectional images. Since tissue near the stomach are transparent, it was impossible to distinguish the region of interest in the images through manual operations.

FIG. 12 illustrates a table containing result of extraction by manual operation and when the method according to the present invention was employed. Frame numbers 1, 5, 10, 30, 50, 100, 130, 140, and 150 are cited as samples.

For example, in the 10th frame, when the extraction was performed manually, 1663 pixels were judged to be inside of the region, and when the method according to the present invention was employed, 1726 pixels were judged to be inside the region. That is, 63 pixels were wrongly judged to be inside the region during manual operation. Thus, an accuracy of 96.35 percent could be achieved with the method according to the present invention. Similarly, in the manual operation, 75074 pixels were judged to be outside of the region, and when the method according to the present invention was employed, 75015 pixels were judged to be inside the region. That is, 52 pixels were wrongly judged to be outside of the region during manual operation. Thus, an accuracy of 99.92 percent could be achieved with the method according to the present invention.

Thus, for progressive number of images, high accuracy could be achieved. Accuracy of almost 95 percent (94.81 percent) could be achieved for frames up to frame number 130. This means an error of 5 percent, thereby indicating that the extraction of region could be achieved without any difference as compared to that with the manual extraction.

However, due to a big variation in the saturation value of the actual region of the crystalline lens and the saturation value of the region that could be seen through, it was possible to separate them by this technique.

Figure 13A:
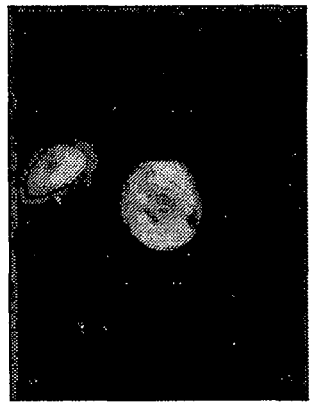
FIG. 13A is the original image.
Figure 13C:
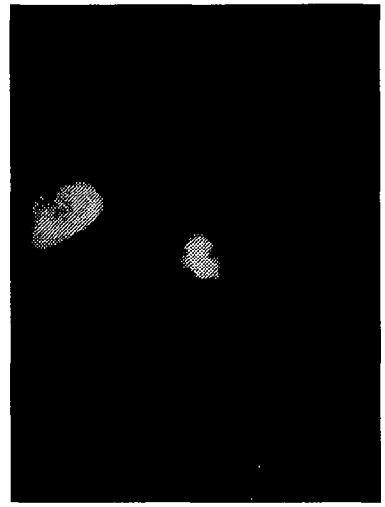
FIG. 13C is a resultant image according to a second experiment.
Figure 13B:
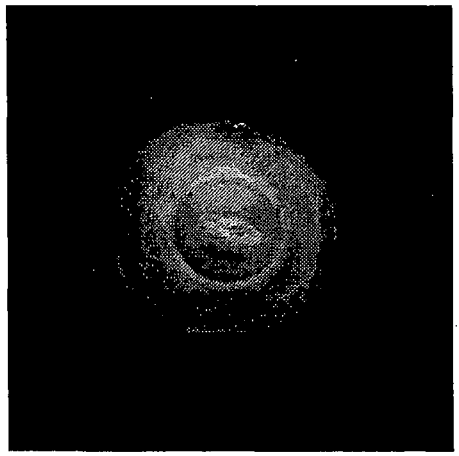
FIG. 13B is the 3-dimensional model.

FIGS. 13A to 13C illustrate data and results of a second experiment. From 840 continuous cross sectional images of the human eyeball, only the eyeball was extracted from a background (mountant). Although the mountant is blue in color, there is a difference in the blue color depending on place. It is difficult to exclude only the blue color with one threshold value. Moreover, it was difficult to extract from a large number of images (840 images). It was possible to carry out automatic continuous extraction by using the technique in the present invention.

Thus, the experiment proved usefulness of the segmentation by using hue and saturation values.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of extracting a region of interest from a plurality of cross-sectional images of a sliced three-dimensional object, comprising:
   specifying an initial region from a first cross-sectional image of the plurality of cross sectional images;
   calculating a first value based on pixel values of each pixel inside the initial region;
   calculating a second value based on pixel values of each pixel outside the initial region;
   selecting, as a first temporary region, a region that is at the same position as the initial region, from a second cross-sectional image corresponding to a second cross section next to a first cross section corresponding to the first cross-sectional image;
   obtaining a pixel value of a first pixel near a boundary of the first temporary region;
   determining whether the first pixel is inside the region of interest based on the pixel value of the first pixel, the first value, and the second value;
   obtaining a pixel value of a second pixel outside the first temporary region and near the first pixel, if the first pixel is determined to be inside the region of interest;
   obtaining a pixel value of a third pixel inside the first temporary region and near the first pixel, if the first pixel is determined to be outside the region of interest;
   determining whether the second pixel or third pixel is inside the region of interest based on the pixel value of the second pixel or third pixel obtained, the first value, and the second value;
   selecting, as a second temporary region, a region that is at the same position as the initial region including all pixels that have been determined to be inside the region of interest in the second cross-sectional image, from a third cross-sectional image corresponding to a third cross section next to the second cross section;
   obtaining a pixel value of a fourth pixel near the second temporary region;
   calculating a third value based on pixel values of each pixel inside the first temporary region and the initial region;
   calculating a fourth value based on pixel values of each pixel outside the first temporary region and the initial region; and
   determining whether the fourth pixel is inside the region of interest based on the pixel value of the fourth pixel, the third value, and the fourth value.

2. The method according to claim 1, wherein the first to fourth values are calculated based on density values expressed by the HSV color model, and the pixel values of the first to fourth pixels are density values expressed by the HSV color model.

3. The method according to claim 2, wherein
   the first value is a median of H values and S values of pixels inside the initial region;
   the second value is a median of H values and S values of pixels outside the initial region;
   the third value is a median of H values and S values of both pixels inside the initial region and the first temporary region; and
   the fourth value is a median of H values and S values of both pixels outside the initial region and the first temporary region.

4. The method according to claim 3, wherein the determining of whether each of the first to fourth pixels is inside the region of interest comprises:
   comparing a first difference between the pixel value of the first or second or third pixel and the first value with a second difference between the pixel value of the first or second or third pixel and the second value, and determining that the first or second or third pixel is inside the region of interest if the first difference is smaller than or equal to the second difference, and determining that the first or second or third pixel is outside the region of interest if the first difference is greater than the second difference; and
   comparing a third difference between the pixel value of the fourth pixel and the third value with a fourth difference between the pixel value of the fourth pixel and the fourth value, and determining that the fourth pixel is inside the region of interest if the third difference is smaller than or equal to the fourth difference, and determining that the fourth pixel is outside the region of interest if the third difference is greater than the fourth difference.

5. The method according to claim 1, wherein the plurality of cross-sectional images are full-color images of an organism.

6. The method according to claim 1, wherein the initial region is specified manually.

7. The method according to claim 1, wherein the initial region is extracted automatically through an image processing technology.

8. The method according to claim 1, further comprising selectively storing and displaying pixels that have been determined to be inside the region of interest.

9. The method according to claim 1, wherein the region of interest is three-dimensional.

10. A computer readable medium embodying a computer program for performing a method of extracting a region of interest from a plurality of cross-sectional images of a sliced three-dimensional object, the method comprising:

specifying an initial region from a first cross-sectional image of the plurality of cross sectional images;

calculating a first value based on pixel values of each pixel inside the initial region;

calculating a second value based on pixel values of each pixel outside the initial region;

selecting, as a first temporary region, a region that is at the same position as the initial region, from a second cross-sectional image corresponding to a second cross section next to a first cross section corresponding to the first cross-sectional image;

obtaining a pixel value of a first pixel near a boundary of the first temporary region;

determining whether the first pixel is inside the region of interest based on the pixel value of the first pixel, the first value, and the second value;

obtaining a pixel value of a second pixel outside the first temporary region and near the first pixel, if the first pixel is determined to be inside the region of interest;

obtaining a pixel value of a third pixel inside the first temporary region and near the first pixel, if the first pixel is determined to be outside the region of interest;

determining whether the second pixel or third pixel is inside the region of interest based on the pixel value of the second pixel or third pixel obtained, the first value, and the second value;

selecting, as a second temporary region, a region that is at the same position as the initial region including all pixels that have been determined to be inside the region of interest in the second cross-sectional image, from a third cross-sectional image corresponding to a third cross section next to the second cross section;

obtaining a pixel value of a fourth pixel near the second temporary region;

calculating a third value based on pixel values of each pixel inside the first temporary region and the initial region;

calculating a fourth value based on pixel values of each pixel outside the first temporary region and the initial region; and determining whether the fourth pixel is inside the region of interest based on the pixel value of the fourth pixel, the third value, and the fourth value.

11. The computer readable medium embodying a computer program according to claim 10, wherein the first to fourth values are calculated based on density values expressed by the HSV color model, and the pixel values of the first to fourth pixels are density values expressed by the HSV color model.

12. The computer readable medium embodying a computer program according to claim 11, wherein the first value is a median of H values and S values of pixels inside the initial region;

the second value is a median of H values and S values of pixels outside the initial region;

the third value is a median of H values and S values of both pixels inside the initial region and the first temporary region; and the fourth value is a median of H values and S values of both pixels outside the initial region and the first temporary region.

13. The computer readable medium embodying a computer program according to claim 12, wherein the determining of whether each of the first to fourth pixels is inside the region of interest comprises:

comparing a first difference between the pixel value of the first or second or third pixel and the first value with a second difference between the pixel value of the first or second or third pixel and the second value, and determining that the first or second or third pixel is inside the region of interest if the first difference is smaller than or equal to the second difference, and determining that the first or second or third pixel is outside the region of interest if the first difference is greater than the second difference; and comparing a third difference between the pixel value of the fourth pixel and the third value with a fourth difference between the pixel value of the fourth pixel and the fourth value, and determining that the fourth pixel is inside the region of interest if the third difference is smaller than or equal to the fourth difference, and determining that the fourth pixel is outside the region of interest if the third difference is greater than the fourth difference.

14. The computer readable medium embodying a computer program according to claim 10, wherein the plurality of cross-sectional images are full-color images of an organism.

15. The computer readable medium embodying a computer program according to claim 10, wherein the initial region is specified manually.

16. The computer readable medium embodying a computer program according to claim 10, wherein the initial region is extracted automatically through an image processing technology.

17. The computer readable medium embodying a computer program according to claim 10, further comprising selectively storing and displaying pixels that have been determined to be inside the region of interest.

18. The computer readable medium embodying a computer program according to claim 10, wherein the region of interest is three-dimensional.

19. An image processing apparatus configured to extract a region of interest from a plurality of cross-sectional images of a sliced three-dimensional object, comprising:

an initial region setting unit configured to specify an initial region from a first cross-sectional image of the plurality of cross-sectional images;

a calculating unit configured to calculate a first value based on pixel values of each pixel inside the initial region, and a second value based on pixel values of each pixel outside the initial region;

a temporary region setting unit configured to select, as a first temporary region, a region that is at the same position as the initial region, from a second cross-sectional image corresponding to a second cross section next to a first cross section corresponding to the first cross-sectional image;

a pixel value unit configured to obtain a pixel value of a first pixel near a boundary of the first temporary region; and a determining unit configured to determine whether the first pixel is inside the region of interest based on the pixel value of the first pixel, the first value, and the second value; wherein the pixel value unit is further configured to obtain a pixel value of a second pixel outside the first temporary region and near the first pixel, if the first pixel is determined to be inside the region of interest, and to obtain a pixel value of a third pixel inside the first temporary region and near the first pixel, if the first pixel is determined to be outside the region of interest;

the determining unit is further configured to determine whether the second pixel or third pixel is inside the region of interest based on the pixel value of the second pixel or third pixel obtained, the first value, and the second value;

the temporary region setting unit is further configured to select, as a second temporary region, a region that is at the same position as the initial region including all pixels that have been determined to be inside the region of interest in the second cross-sectional image, from a third cross-sectional image corresponding to a third cross section next to the second cross section;

the pixel value unit is further configured to obtain a pixel value of a fourth pixel near the second temporary region;

the calculating unit is further configured to calculate a third value based on pixel values of each pixel inside the first temporary region and the initial region, and to calculate a fourth value based on pixel values of each pixel outside the first temporary region and the initial region; and the determining unit is further configured to determine whether the fourth pixel is inside the region of interest based on the pixel value of the fourth pixel, the third value, and the fourth value.

20. The apparatus according to claim 19, further comprising a storage unit configured to store flag information corresponding to each pixel of the region of interest.

21. The apparatus according to claim 20, further comprising a display unit configured to display the region of interest based on the flag information.

* * * * *